United States Patent [19]

Spicuzza, Jr.

[11] 4,048,272
[45] Sept. 13, 1977

[54] METHOD FOR PREPARING IMPROVED EXPANDED POLYSTYRENE SHEET

[75] Inventor: John P. Spicuzza, Jr., Pittsburgh, Pa.

[73] Assignee: ARCO Polymers, Inc., Philadelphia, Pa.

[21] Appl. No.: 646,293

[22] Filed: Jan. 2, 1976

[51] Int. Cl.² ............................................. B29D 27/00
[52] U.S. Cl. ................................ 264/45.3; 260/2.5 B; 260/2.5 E; 260/42.43; 264/53; 264/211; 264/DIG. 5; 264/45.9; 264/DIG. 13; 264/DIG. 17
[58] Field of Search ...... 264/45.3, DIG. 13, DIG. 14, 264/DIG. 17, 53, 45.9, 211, DIG. 5; 260/2.5 B, 2.5 M, 42.43

[56] References Cited

U.S. PATENT DOCUMENTS

| | | | |
|---|---|---|---|
| 3,661,810 | 5/1972 | Gahmig | 260/2.5 B |
| 3,696,061 | 10/1972 | Selsor et al. | 260/2.5 M |
| 3,912,667 | 10/1975 | Spitzer et al. | 264/DIG. 17 |
| 3,950,484 | 4/1976 | Egli | 264/DIG. 14 |

OTHER PUBLICATIONS

"The Condensed Chemical Dictionary" Eighth Edition, revised by Gessner G. Hawley, New York, Van Nostrand Reinhold, c1971, pp. 148, 446, 783.
Cabot Corp. Bulletins, "Silanox 101 : A New Approach to the Control of Powder Materials", by Paul R. Tully, Boston, Mass., Cabot Corp., (1972) STD-201, pp. 1–4.

Primary Examiner—Philip Anderson
Attorney, Agent, or Firm—Coleman R. Reap

[57] ABSTRACT

Expanded styrene polymer sheet material is produced by extruding expandable and/or general purpose styrene polymer with a conventional blowing agent, a nucleating system and a small amount of finely divided hydrophobic silicon dioxide. The resulting product has very fine, uniformly sized pores and improved flexibility.

11 Claims, No Drawings

METHOD FOR PREPARING IMPROVED EXPANDED POLYSTYRENE SHEET

BACKGROUND OF THE INVENTION

Field of the Invention

This invention relates to styrene polymer sheet and more particularly to low density styrene polymer sheet material.

Over the past few years there has been a great increase in the use of expanded styrene polymer in sheet form. One of the main reasons for the increased demand for this material is that expanded styrene polymer, even in thin sheet form, offers the advantages of high structural strength and low density. Because of its excellent physical properties and relatively low cost expanded styrene polymer sheet material is used in the manufacture of thermoformed products such as egg cartons, trays used in the retail packaging of meat and produce, and in various other commercial and industrial applications.

In order to produce expanded styrene polymer sheet which has good physical strength properties it is desirable to use a feedstock which has been specially formulated for extrusion into sheet material. Suitable feedstock contains, in addition to an expanding agent, a nucleating system to facilitate the production of microporous expanded styrene sheet material. Fine-celled expanded styrene polymer sheet has been found to have greater structural strength and less brittleness than larger celled expanded sheet material and is, therefore, more readily adaptable to post extrusion procedures such as the above-mentioned thermoforming operations.

Manufacturers of expanded styrene polymer sheet have found that they can reduce the cost of production of expanded styrene polymer sheet by combining or replacing extrusion grade feedstock with various other styrene polymer material, such as general purpose styrene polymer and off-grade expandable styrene polymer particles, e.g., beads or pellets which are unsuitable for molding purposes because they are over or under sized or because they contain an insufficient amount of blowing agent for the production of high quality molded products. These materials can be made useful for the extrusion manufacture of expanded sheet material by adding nucleating agents to them and, if desired, incorporating additional blowing agent into them, for example, by injecting blowing agent into molten feedstock made from these materials while it is resident in the barrel of the sheet extruder.

One of the problems encountered in the production of extruded styrene polymer foamed sheet material is that the product sometimes lacks uniformity in flexibility and physical appearance. Thus, while some portions of an extruded sheet product are of high quality, other portions contain large and irregularly sized cells. Large cells in foamed polymer sheet not only cause the sheet to be less desirable in appearance but also render it quite brittle so that it cannot satisfactorily be used in thermoforming operations and other product applications.

It has been determined that a significant cause of the development of large cells in extruded foam sheet product is the presence of contaminants and/or moisture in the feedstock. Contaminants are often contained in the feedstock because chemicals and other substances which were added to the styrene polymer polymerization formulation during or subsequently to polymerization, such as suspending agents or other polymerization aids, were not completely removed from the polymerized product. Moisture in the polymer feedstock often results from the sorption of water droplets or vapor onto or into the feedstock. Moisture may also be introduced into the molten polymer by chemical reaction between the components of the nucleating system in the heated barrel of the extruder.

It is believed that the variation in the distribution of the contaminants and moisture throughout the feedstock is responsible for the wide variation in cell size in the extrudate. For example, in expandable polymer materials which contain a nucleating system comprised of an acid and an alkali metal carbonate which react and release carbon dioxide, high local concentrations of contaminants are likely to interfere with the reaction rate of the nucleating system thereby causing uneven rates of release of carbon dioxide with the result that the expanded product may contain cells which vary widely in size. The variation in distribution of contaminants and moisture in the feedstock is often caused by the use of a feedstock comprised of a mixture of various batches of materials, some of which contain considerable amounts of contaminants and/or moisture. Although the variation can be minimized by blending operations, this is not usually done because the additional expense of such operations make it economically unfeasible. The moisture contents of the extruder feedstock can be controlled by selecting moisture-free feed materials or by drying moisture-containing feedstock but this would also prohibitively increase the cost of producing a competitive expanded styrene polymer sheet. It would be desirable to eliminate the effects caused by contaminants and moisture in sheet extruder polymer feedstock without resorting to unnecessary blending and/or drying steps.

SUMMARY OF THE INVENTION

A method has now been discovered for improving the cell size uniformity of expanded styrene polymer sheet product. This method also makes it possible to produce expanded styrene polymer sheet material having a fine, uniform pore size from styrene polymer feedstock which contains contaminants and/or moisture. Accordingly, it is an object of the invention to present an improved method of manufacturing expanded styrene polymer sheet material. It is another object of the invention to present a method of manufacturing extruded, expanded styrene polymer sheet material having small, uniformly sized cells. It is another object of the invention to present a method of manufacturing extruded, expanded styrene polymer sheet material of fine uniform cell size from styrene polymer feedstock containing contaminants and/or moisture. It is another object of the invention to present a method of forming high quality expanded styrene polymer sheet material from general purpose styrene polymer or off-grade expandable polymer feedstock. These and other objects of the invention will become apparent from the following description and examples.

In accordance with a preferred embodiment of the invention the above objects are accomplished by the extrusion of a mixture comprised of a styrene polymer, a blowing agent, a conventional nucleating system and a hydrophobic silica. The conventional nucleating system and hydrophobic silica are preferably mixed with the styrene polymer prior to the introduction of the polymer into the extruder. The feedstock may be general purpose or expandable styrene polymer or mixtures of these. Additional or all of the blowing agent may be injected into the styrene polymer feedstock mixture while it is in the barrel of the extruder. The amount of hydrophobic silica used in producing styrene polymer sheet material according to the invention usually varies from about 0.002 to 2% and preferably about 0.01% to 0.5%, based on the weight of polymer in the feedstock. The hydrophobic silica usually has a particle size of about 1 to 500 and preferably about 2 to 50 millimicrons.

PRIOR ART

U.S. Pat. No. 3,661,810 discloses the use of finely divided hydrophobic silica to prevent clumping of thermoplastic particles, particularly expandable polystyrene particles. U.S. Pat. No. 3,505,253 discloses polymerizing alkenyl aromatic monomers in the presence of an alkenyl/aromatic polymer and an organically disubstituted polysiloxane. U.S. Pat. No. 3,563,924 and 3,634,344 disclose the preparation of polyester-polyurethane foams having small and uniform cell size by the reaction of hydroxylated-polyesters and polyisocyanates in the presence of polyoxylalkylene-polysiloxane block copolymer. U.S. Pat. No. 3,582,502 discloses treating foam rubber with active silica to improve its compression resistance. U.S. Pat. No. 3,696,061 discloses a molding powder comprised of polyvinyl chloride resin and silica. U.S. Pat. No. 3,511,788 discloses the preparation of foams from thermoplastic polymer-containing plastisols and $SiO_2$-containing copolymers.

DESCRIPTION OF THE INVENTION

The term "styrene polymers", as used in this disclosure, means thermoplastic polymers which are capable of being expanded and which are made from vinyl aromatic homopolymers, copolymers of two or more vinyl aromatic monomers, copolymers of vinyl aromatic monomers with other monomers copolymerizable therewith which contain at least 50% by weight vinyl aromatic component, or copolymers of vinyl aromatic monomers with rubbery polymers. Vinyl aromatic monomers suitable for use in this invention include styrene, alpha-methylstyrene, vinyltoluene, isopropylstyrene, nuclear dimethylstyrenes, chlorostyrene, vinylnaphthalene, divinylbenzene, etc. Monomers copolymerizable with the vinyl aromatic monomers include diene monomers, such as butadiene; acrylic monomers, such as alkyl acrylates; alkyl methacrylates, acrylonitrile; etc. and vinyl esters, such as vinyl acetate, vinyl propionate, etc. Rubbery polymers which may be copolymerized with the vinyl aromatic monomer include polyisobutylene, diene rubbers, such as polyisoprene, polybutadiene, etc. The preferred feedstock is styrene homopolymer.

The feedstock material may be any feedstock material usually used in the extrusion of expanded sheet polymer including fresh extrusion grade expandable polymer, off-grade expandable extrusion or molding polymer, general purpose polymer, i.e., thermoplastic polymer which contains no blowing agent, or mixtures of two or more of these.

The blowing agent used to produce the expansion of the polymer may be any of the blowing agents usable in producing expanded sheet material including compounds which are gases or which will produce gases upon heating and which are substantially inert to the polymer. Preferred blowing agents include aliphatic or cycloaliphatic hydrocarbons having from 1 to 7 carbon atoms, such as methane, propane, butane, pentane, hexane, cyclohexane and their halogenated derivatives which boil at a temperature below the softening point of the polymer. Mixtures of these blowing agents may be employed, if desired. A preferred blowing agent is pentane, especially normal pentane. The blowing agent is usually employed at a concentration of about 3 to 10%, and preferably at about 5 to 7%, based on the total weight of polymer. The blowing agent is often incorporated into the polymer prior to extrusion. In other words, the feedstock may be partly or completely comprised of expandable styrene polymer. Alternatively the blowing agent may be incorporated into the polymer during extrusion. For the latter embodiment ports for the introduction of the blowing agent are provided at various locations in the barrel of the extruder. A location or locations which will produce the desired mixing is selected. This method is employed when the feedstock contains no blowing agent or an insufficient amount of blowing agent to produce a foamed product of the desired density. The particular blowing agent used, and the methods of incorporating it into the polymer prior to and/or during extrusion are all well known in the prior art and form no part of the invention.

The nucleating system used in the invention can be any of the nucleating systems normally used in combination with blowing agents in the manufacture of microcellular materials. The nucleating system is used at concentrations of about 0.01 to 5% and preferably about 0.05 to 3%, based on the total weight of polymer. Nucleating systems useful in the invention include carbon dioxide; nitrogen; compounds which decompose to produce carbon dioxide or nitrogen; compounds which decompose to produce carbon dioxide or nitrogen; such as 1,1'-azodisformamidi; chemical compound mixtures which react to produce carbon dioxide or nitrogen, such as mixtures of alkali or alkaline earth carbonates and organic acids, e.g., sodium bicarbonate and citric acid; styrenemaleic anhydride copolymers; aluminum silicate; amino acids; ammonium citrate; acid phosphate baking powders; potassium metasilicate; mixtures of magnesium silicate and silica; fluorocarbon polymers; etc.

The nucleating system can be added at various times depending upon which nucleating system is employed. Polymeric nucleating systems, such as styrene-maleic anhydride and other stable nucleating agents are usually blended with the polymeric feedstock prior to introduction of the feedstock into the extruder. This may be accomplished at any time, such as shortly after polymerization or just prior to the introduction of the polymer into the extruder. In the case of nucleating systems which are comprised of two reactants which combine chemically to produce the nucleating agent, it is often desirable to isolate the two reactants to prevent premature reaction. One method of accomplishing this is by encapsulating one of the reactants in a small portion of the polymer. The encapsulated reactant is blended with the polymer feed prior to extrusion. The encapsulated reactant is thereby isolated from the other reactant until the polymer particles melt in the extruder barrel. This procedure can be beneficially used with acid-carbonate systems which react to produce carbon dioxide.

The hydrophobic silica can be prepared by treating any of the well known forms of silica to render it hydrophobic. Suitable forms of silica include fumed silica, precipitated silica, and silica aerogel. These silica materials and the methods of rendering them hydrophobic are described in detail in U.S. Pat. No. 3,661,810, the disclosure of which is incorporated herein by reference. A preferred silica is fumed silica, prepared by burning silicon tetrachloride and collecting the resulting silica smoke. The fumed silica is preferably rendered hydrophobic by reaction with a halogenated silane such as trimethylsilyl chloride.

The average particle size of the hydrophobic silica is usually under 500 millimicrons and preferably in the range of about 1 to 100 millimicrons. The ideal hydrophobic silica has an average particle size of about 2 to 50 millimicrons. The hydrophobic silica can be used in the invention in any amount which is effective to produce the desired result up to about 2% or more, based on the total weight of polymer present. Very small amounts have been found to produce excellent results using polymeric feedstock that produces an unacceptable foamed sheet when no hydrophobic silica is employed. Amounts of hydrophobic silica varying from about 0.002 to 2%, based on the total weight of polymer present in the feed mixture are usually effective. The preferred concentration is about 0.01 to 0.5%, based on the total weight of polymer present.

The hydrophobic silica is usually combined with the styrene polymer feedstock prior to extrusion. In order to obtain a uniform distribution of the hydrophobic silica in the feedstock it is preferred to blend the silica and the feedstock thoroughly prior to extrusion. The hydrophobic silica and the nucleating system can be conveniently blended with the polymer feedstock at the same time. Other additives, such as plasticizers, fillers, colorants and pigments, antioxidants, etc. can also be blended with the polymer feedstock at this time. As an alternative the hydrophobic silica can be blended with general purpose polystyrene at a relatively high concentration and the blend extruded and pelletized. The pelletized material can then be added to other feedstock at a ratio which will provide the desired amount of hydrophobic silica in the feedstock which is to be sheet extruded. This alternative is often preferred when one component of a two-component nucleating system is encapsulated in a portion of the polymer feedstock. The hydrophobic silica and the nucleating system component can be encapsulated in the polymer at the same time. Any of the above or other methods of combining the hydrophobic silica and the styrene polymer feedstock can be employed and those methods which will provide a uniform distribution of the hydrophobic silica in the feedstock are preferred.

In accordance with a preferred embodiment of the invention particulate sytrene polymer feedstock, a nucleating system, hydrophobic silica and other desirable additives are combined and blended to produce a uniform distribution of the additives in the polymer. The particulate feedstock is fed into the hopper of an extruder equipped with heaters and injection ports. As the feedstock is advanced through the barrel of the extruder it is heated to a temperature at which it becomes molten. This temperature varies with different polymers or copolymers but is usually in the range of about 200° to 375° F. The molten polymer is usually advanced through the barrel at a pressure of about 200 to 2000 psig. The pressure is preferably maintained sufficiently high in the extrusion screw and extrusion die that very little or no foaming of the polymer occurs prior to extrusion. As the molten material is advanced through the extruder a blowing agent, such as pentane, may be combined with it. The amount of blowing agent added at this point will vary depending on the amount of blowing agent which the feedstock contains and the desired density of the product. The sheet material may be extruded through a flat elongated sheet die or through an annular die. Extrusion procedures are well known in the art and the particular method of extrusion employed in the invention forms no part of this invention. The extruded sheet will contain small, uniformly sized cells and be highly suitable for post extrusion operations such as thermoforming.

The mechanism by which the hydrophobic silica functions in this invention is not known with certainty. It is believed that the hydrophobic silica prevents the contaminants and moisture from interfering with the proper functioning of the nucleating system. In any event the appearance and flexibility of extruded, expanded styrene polymer sheet product is markedly improved by incorporating into the polymer feedstock, in addition to a conventional nucleating system, hydrophobic silica.

The following examples illustrate preferred embodiments of the invention. Unless otherwise indicated parts and percentages are on a weight basis.

EXAMPLE I

A mixture comprised of extrusion grade expandable polystyrene particles, 5.5% n-pentane, 0.2% sodium bicarbonate, 0.2% citric acid and 0.1% hydrophobic silica (sold by Cabot Corporation under the trademark Silanox 101) is charged into a production extruder equipped with a sheet die. The barrel of the die is equipped with heaters and an injection port for the introduction of blowing agent into the extruder barrel. During extrusion the throat of the extruder is maintained at 250° F, the barrel at 275° F, and the block at 300° F. The extruded sheet product has an average thickness of 100 mils. The extruded sheet is aged for 24 hours at room temperature after which it is examined for appearance, flexibility, and cell size. The product has excellent appearance and flexibility. Portions of the sheet are sliced off with a razor blade. The exposed edges show that the cells are uniform and have diameters generally in the range of 2 to 3 mils. A portion of the sheet is placed in a heated deep draw mold and molded into a test object. The walls of the molded object are flexible and have smooth, continuous surfaces and excellent appearance.

EXAMPLE II

Expanded polystyrene sheet is produced and aged in accordance with the procedure of Example I except that the feedstock being extruded is comprised of a mixture of expandable polystyrene particles taken from several lots, some of which have relatively high moisture contents and considerable amounts of fine contaminants. The contaminants are essentially polymerization additives and their presence in the product is the result of incomplete removal after polymerization. The aged sheet has good flexibility and uniformly sized cells, generally in the range of about 2 to 3 mils. A molded object is made from the extruded aged sheet in accordance with the procedure of Example I. The molded object is flexible, has a smooth, continuous surface and excellent appearance.

EXAMPLE III

Expanded polystyrene sheet is produced and aged in accordance with the procedure of Example II except that the hydrophobic silica is omitted from the formulation. The aged extruded sheet product is brittle and contains irregularly sized cells having an average size of about 3 to 5 mils. A molded object is made from the extruded aged sheet according to the procedure of Example I. The walls of the molded object are brittle and its surfaces have several cracks at points where the sheet is subjected to flexural stress during molding.

EXAMPLE IV

Expanded polystyrene sheet is produced and aged in accordance with the procedure of Example I except that the polystyrene feedstock contains only about 3% n-pentane. Additional n-pentane is introduced into the barrel of the extruder during extrusion at a rate such that the molten polymer contains a total of about 5% n-pentane prior to being extruded. The aged, extruded sheet has uniformly sized cells generally in the range of about 2 to 3 mils. A molded object is made from the extruded, aged sheet according to the procedure of Example I. The walls of the molded object are flexible and have smooth, continuous surfaces and excellent appearance.

EXAMPLE V

Expanded polystyrene sheet is produced and aged in accordance with the procedure of Example I except that the feedstock is made up of general purpose polystyrene. n-Pentane is introduced into the barrel of the extruder at a rate such that the molten polymer contains about 5% n-pentane prior to extrusion. The aged sheet has excellent flexibility and uniformly sized cells, generally in the range of 2 to 3 mils. A molded object is made from the extruded, aged sheet in accordance with the procedure of Example I. The walls of the molded object are flexible and have smooth, continuous surfaces and excellent appearance.

Examples I to V illustrate various embodiments of the invention. Examples I and II show that the process of the invention is useful for producing high quality expanded sheet material from expandable polystyrene particles. A comparison of Examples II and III show that good quality extruded expanded sheet can be produced from a feedstock containing moisture and contaminants when a small amount of hydrophobic silica is added to the feedstock whereas a poor quality sheet, generally unsuitable for thermoforming operations is produced from the same feedstock to which no hydrophobic silica is added. Examples IV and V illustrate embodiments of the invention in which general purpose polystyrene is used as part or all of the feedstock.

Although the invention is illustrated with particular reference to specific examples it is understood that the scope of the invention is not limited thereto but is determined solely by the breadth of the appended claims.

I claim:

1. In a process for producing microcellular expanded styrene polymer sheet by extruding a mixture containing styrene polymer, a blowing agent and a nucleating system, the improvement comprising extruding with said mixture about 0.002 to 2%, based on the total weight of styrene polymer, of hydrophobic silica, said hydrophobic silica being uniformly distributed throughout said mixture whereby said sheet has improved flexability.

2. The improved process of claim 1 wherein said hydrophobic silica is blended with the styrene polymer before it is fed into the extruder.

3. The improved process of claim 1 wherein said hydrophobic silica is added to the styrene polymer in the barrel of the extruder.

4. The improved process of claim 1 wherein the amount of hydrophobic silica extruded with said mixture is about 0.01 to 0.5%, based on the total weight of styrene polymer.

5. The improved process of claim 1 wherein expandable polystyrene material is used in forming said mixture.

6. The improved process of claim 1 wherein a portion of the styrene polymer is general purpose polystyrene and a portion of the blowing agent is injected into the molten polymer while it is in the barrel of the extruder.

7. The improved process of claim 1 wherein the styrene polymer is general purpose polystyrene and the blowing agent is injected into the molten polymer while it is in the barrel of the extruder.

8. A process of extruding expanded styrene polymer sheet having a small and uniform cell size from styrene polymer feedstock comprising extruding a mixture comprised of the styrene polymer, about 3-10% blowing agent, about 0.01 to 5% nucleating system, and about 0.002 to 2% hydrophobic silica having an average particle size of about 1 to 100 millimicrons, said percentages being based on the total weight of styrene polymer being extruded.

9. The process of claim 8 wherein said blowing agent, nucleating system and hydrophobic silica are present in the amounts of about 5 to 7%, about 0.05 to 3% and about 0.01 to 0.5% respectively, based on the total weight of styrene polymer and said hydrophobic silica has an average particle size of about 2 to 50 millimicrons.

10. The process of claim 9 wherein the styrene polymer is polystyrene, the blowing agent is pentane, the nucleating system is comprised of an organic acid and alkali or alkaline earth metal carbonate, and the hydrophobic silica is hydrophobic fumed silica.

11. The process of claim 10 wherein the nucleating system is comprised of citric acid and sodium bicarbonate.

* * * * *